(12) United States Patent
Ricketts

(10) Patent No.: US 10,986,777 B2
(45) Date of Patent: Apr. 27, 2021

(54) VENTED SIDE MEMBER FOR AN AGRICULTURAL VEHICLE

(71) Applicant: CNH Industrial America LLC, New Holland, PA (US)

(72) Inventor: Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 220 days.

(21) Appl. No.: 15/962,211

(22) Filed: Apr. 25, 2018

(65) Prior Publication Data
US 2019/0327890 A1    Oct. 31, 2019

(51) Int. Cl.
| | |
|---|---|
| *A01D 41/12* | (2006.01) |
| *A01F 7/06* | (2006.01) |
| *A01F 12/44* | (2006.01) |
| *A01F 12/48* | (2006.01) |
| *A01F 12/54* | (2006.01) |
| *A01F 12/00* | (2006.01) |

(52) U.S. Cl.
CPC ............ *A01D 41/1243* (2013.01); *A01F 7/06* (2013.01); *A01F 12/00* (2013.01); *A01F 12/44* (2013.01); *A01F 12/48* (2013.01); *A01F 12/54* (2013.01)

(58) Field of Classification Search
CPC ............ A01D 41/1243; A01D 41/1252; A01D 41/1276; A01D 43/077; A01F 7/06; A01F 7/067; A01F 12/00; A01F 12/44; A01F 12/18–187; A01F 12/20–28; A01F 12/444; A01F 12/48; A01F 12/54
See application file for complete search history.

(56) References Cited

U.S. PATENT DOCUMENTS

| | | | |
|---|---|---|---|
| 629,873 A | 8/1899 | Russell | |
| 1,007,970 A | 11/1911 | Pella | |
| 1,275,770 A | 8/1918 | Scott | |
| 2,750,037 A | 6/1956 | Taylor | |
| 2,811,158 A | 10/1957 | Rietmann | |
| 3,101,721 A | 8/1963 | Fuller | |
| 3,384,232 A | 5/1968 | Turnbull et al. | |
| 3,495,598 A | 2/1970 | Louks et al. | |
| 3,566,880 A * | 3/1971 | Riffe | A01F 12/48 460/99 |

(Continued)

FOREIGN PATENT DOCUMENTS

| | | | |
|---|---|---|---|
| CA | 2465143 | * 4/2009 | ............. A01D 41/00 |
| CN | 201135044 Y | 10/2008 | |
| GB | 1 249 841 | 10/1971 | |

OTHER PUBLICATIONS

Extended European Search Report for EP application 19171219.9, dated Aug. 21, 2019 (8 pages).

*Primary Examiner* — Adam J Behrens
(74) *Attorney, Agent, or Firm* — Peter Zacharias; Patrick Sheldrake

(57) ABSTRACT

An agricultural vehicle including a chassis, at least one rotor supported by the chassis and configured for threshing a crop material, at least one exterior side member supported by the chassis and including at least one outlet, and an air conduit located underneath the at least one rotor. The air conduit is configured for providing an airstream directed to the at least one exterior side member such that the airstream forces a material other than grain out through the at least one outlet.

13 Claims, 5 Drawing Sheets

(56) References Cited

U.S. PATENT DOCUMENTS

| | | | |
|---|---|---|---|
| 3,696,815 A | 10/1972 | Rowland-Hill et al. | |
| 4,051,856 A * | 10/1977 | Reed | A01F 12/442 460/98 |
| 4,249,543 A | 2/1981 | Rowland-Hill | |
| 4,284,086 A * | 8/1981 | Williams | A01F 12/18 460/150 |
| 4,412,549 A | 11/1983 | Rowland-Hill | |
| 4,441,512 A | 4/1984 | Busboom | |
| 4,711,253 A * | 12/1987 | Anderson | A01D 41/1243 460/100 |
| 4,923,431 A * | 5/1990 | Miller | A01D 41/1243 239/655 |
| 5,045,025 A * | 9/1991 | Underwood | A01F 7/06 460/113 |
| 5,120,275 A * | 6/1992 | Zacharias | A01D 41/1243 460/111 |
| 6,558,252 B2 * | 5/2003 | Visagie | A01F 12/444 460/100 |
| 6,755,735 B2 * | 6/2004 | Linder | A01D 41/12 460/119 |
| 7,008,315 B2 * | 3/2006 | Redekop | A01D 41/1243 460/112 |
| 7,670,219 B2 * | 3/2010 | Matousek | A01F 12/444 460/100 |
| 8,062,109 B1 | 11/2011 | Pearson et al. | |
| 8,720,329 B2 | 5/2014 | Kelderman | |
| 9,179,603 B2 | 11/2015 | Regier | |
| 9,872,439 B2 * | 1/2018 | Pohlmann | A01D 41/1243 |
| 2001/0002367 A1 * | 5/2001 | Visagie | A01F 12/44 460/4 |
| 2001/0029199 A1 * | 10/2001 | Visagie | A01F 12/44 460/84 |
| 2005/0124399 A1 * | 6/2005 | Holmen | A01D 41/1243 460/111 |
| 2016/0316626 A1 * | 11/2016 | Bertino | A01F 12/184 |

* cited by examiner

VENTED SIDE MEMBER FOR AN AGRICULTURAL VEHICLE

FIELD OF THE INVENTION

The present invention relates to agricultural vehicles, and, more particularly, to agricultural vehicles with a separating and cleaning system.

BACKGROUND OF THE INVENTION

An agricultural harvester known as a "combine" is historically termed such because it combines multiple harvesting functions with a single harvesting unit, such as picking, threshing, separating, and cleaning. A combine includes a header, which removes the crop material from a field, and a feeder housing which transports the crop material to a threshing and separating system. The threshing and separating system may include a threshing rotor that rotates within a housing and performs a threshing operation on the crop material to remove the grain. The housing may include adjustable concaves with perforations for the grain to pass therethrough. Once the grain is threshed, it falls through the perforations in the concaves onto a cleaning system. The cleaning system generally includes a grain pan, one or more sieve(s), and a cleaning fan. The cleaning fan blows air through the sieves to discharge chaff and other debris toward the rear of the combine. The clean grain is then transported to a grain tank onboard the combine via a clean grain auger. Material other than grain (MOG), such as straw, debris, dust, etc., from the threshing and separating system proceeds through a residue system, which may utilize a discharge chopper to process the MOG and direct it out through the rear of the combine. Typically, a combine is equipped with side doors that allow an operator to easily access the threshing and separating system.

During operation of the combine, a substantial amount of back pressure may build up inside of the combine, which can decrease the overall efficiency of the threshing and/or cleaning systems. The back pressure within the combine may be caused by numerous factors including the buildup of MOG, the construction of the combine itself, the intake of air into the chamber from the threshing unit, and/or the operation of the cleaning fan which directs an airstream rearwardly across the cleaning system. MOG may burden the cleaning system because the MOG is typically only allowed to exit the rear of the combine; and thus, the presence of MOG may cause the cleaning system to less efficiently clean the grain. As to the construction of the combine, the side doors and paneling of the combine create a sealed environment in which generally all of the air and MOG within the combine may only exit through the rear of the threshing and separating system and then out through the rear of the combine via the residue system. The intake of air via the inflow of crop material and/or by the cleaning fan may create an imbalance of air inflow and outflow because more air can be introduced into the combine than can exit through the rear of the combine. Hence, back pressure builds up within the combine since the air outflow, exiting through one location at the rear of the combine, is not in proportion to the air inflow. The back pressure within the combine may cause the airstream created by the cleaning fan to be less effective and it may also cause MOG, and other airborne debris, to stagnate and/or exit the combine less efficiently.

What is needed in the art is an agricultural vehicle that efficiently and cost-effectively allows air and MOG to more easily exit the combine and increases the efficiency of the threshing and cleaning systems.

SUMMARY OF THE INVENTION

In one exemplary embodiment formed in accordance with the present invention, there is provided an agricultural vehicle that includes exterior side members with outlets. The agricultural vehicle may also include an air conduit for forcibly removing the MOG out through the outlets of the exterior side members. The agricultural vehicle may further include ducts which are fluidly connected to the vents of the exterior side members such that the MOG and air exiting the agricultural vehicle can be further directed to a desired location.

In another exemplary embodiment formed in accordance with the present invention, there is provided an agricultural vehicle including a chassis, at least one rotor supported by the chassis and configured for threshing a crop material, at least one exterior side member supported by the chassis and including at least one outlet, and an air conduit located underneath the at least one rotor. The air conduit is configured for providing an airstream directed to the at least one exterior side member such that the airstream forces a material other than grain out through the at least one outlet.

In another exemplary embodiment formed in accordance with the present invention, there is provided an agricultural vehicle including a chassis, at least one rotor supported by the chassis and configured for threshing a crop material, at least one exterior side member supported by the chassis and including at least one outlet, and an air conduit located underneath the at least one rotor. The air conduit is configured for providing an airstream directed to the at least one exterior side member such that the airstream forces a material other than grain out through the at least one outlet. The agricultural vehicle further includes at least one duct removably connected to the at least one exterior side member and configured for further directing the material other than grain after it exits through the at least one outlet.

In yet another exemplary embodiment formed in accordance with the present invention, there is provided a method including a step of providing an agricultural vehicle including a chassis, at least one rotor supported by the chassis and configured for threshing a crop material, at least one exterior side member supported by the chassis and including at least one outlet, and an air conduit located underneath the at least one rotor and configured for providing an airstream directed to the at least one exterior side member. The method also includes the steps of threshing the crop material by the at least one rotor, forcing an air blast, by the air conduit, outward from the at least one rotor toward the at least one exterior side member, and directing a material other than grain out through the at least one outlet such that the material other than grain exits a side of the agricultural vehicle before traveling downstream of the at least one rotor.

One possible advantage of the exemplary embodiment of the agricultural vehicle is that the amount of MOG exiting the rear of the rotor can be reduced, and thereby, the cleaning system and/or the residue system may operate more efficiently.

Another possible advantage of the exemplary embodiment of the agricultural vehicle is that the amount of back pressure within the agricultural vehicle may be reduced because air and MOG is allowed to efficiently exit the side(s)

of the agricultural vehicle before a buildup of back pressure near the rear of the agricultural vehicle is created.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw", and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
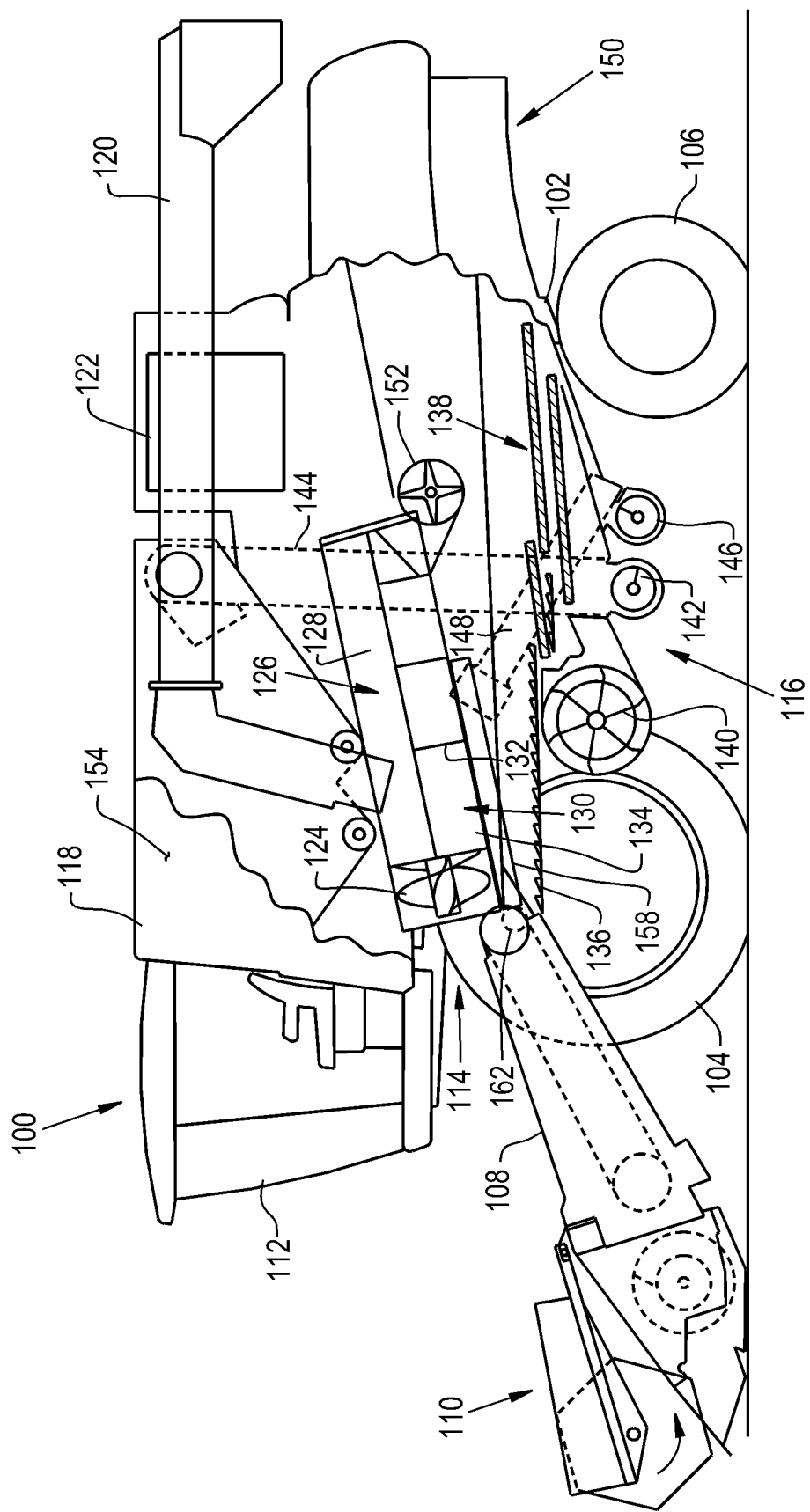
FIG. 1 illustrates a side view of an agricultural vehicle including a rotor, a vented exterior side member, and an air conduit, in accordance with an exemplary embodiment of the present invention.
Figure 2:
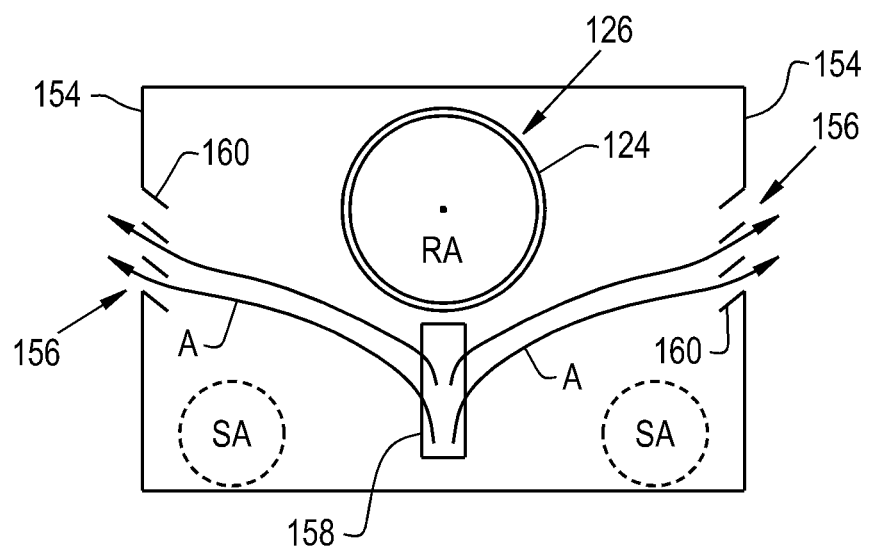
FIG. 2 illustrates schematic view of the agricultural vehicle of FIG. 1, in accordance with an exemplary embodiment of the present invention.

Referring now to the drawings, and more particularly to FIGS. 1-2, there is shown an exemplary embodiment of an agricultural vehicle 100 in the form of a combine 100, which generally includes a chassis 102, ground engaging wheels 104 and 106, a feeder housing 108, a header 110 connected to the feeder housing 108, an operator cab 112, a threshing system 114, a cleaning system 116, a grain tank 118, and an unloading auger 120. Motive force is selectively applied to the front wheels 104 through a prime mover in the form of a diesel engine 122 and a transmission (not shown).

The threshing system 114 may be of the axial-flow type, and may thereby include an axially displaced rotor 124, which is rotatable about a longitudinal rotor axis RA thereof and is at least partially enclosed by and rotatable within a corresponding, cylindrical tube or housing 126. The housing 126 surrounds at least a portion of the rotor 124 and generally includes an upper hemisphere in the form of a rotor shield 128 and a lower hemisphere in the form of one or more concave(s) 130 located at a distance radially away from the rotor 124. In this regard, a gap, e.g. a clearance passage, exists between the rotor 124 and the concave(s) 130 which allows crop material to be threshed therein. As the crop material enters the clearance passage, it may be helically conveyed from the front to the rear of the housing 126 via the motion of the rotor 124. Each concave 130 has a concave frame 132 which is configured for receiving and supporting a concave insert 134. Each concave 130 may include a plurality of perforations, apertures, or orifices therethrough for allowing the passage of correspondingly-sized crop material, such as threshed grain and small particles of MOG.

The cleaning system 116 generally includes a grain pan 136, one or more sieve(s) 138, and a cleaning fan 140. In operation, the cut crop material which has been threshed and separated by threshing system 114 falls onto the grain pan 136 and the sieve(s) 138. The grain pan 136 and the sieve(s) 138 may oscillate in a fore-to-aft manner in order to further sift the crop material. The cleaning fan 140 provides an airflow through the sieve(s) 138 to remove chaff and other impurities such as dust from the grain via making this material airborne for discharge out of the rear of the combine. After passing through the cleaning system 116, the clean grain falls to a clean grain auger 142 positioned crosswise below and in front of the sieve(s) 138. The clean grain auger 142 conveys the clean grain laterally to a generally vertically arranged grain elevator 144 for transport to the grain tank 118. Tailings from the cleaning system 116 are transported via a tailings auger 146 and a return auger 148 to the upstream end of the cleaning system 116 for repeated cleaning action. The non-grain crop material, e.g. MOG, proceeds out of the rear of the combine 100 through a residue system 150, which may include a discharge chopper 152, counter knives, and a residue spreader.

The agricultural vehicle 100 may also include one or more exterior side member(s) 154 that have one or more outlet(s) 156 which allow airborne debris, such as MOG, to pass therethrough. The agricultural vehicle 100 may further include an air conduit 158 for providing an airstream A directed toward the exterior side member(s) 154 such that the airstream A forces MOG out through the outlet(s) 156. It should be understood that the evacuation of MOG, due to the air conduit 158 in conjunction with the vented exterior side member(s) 154, may include allowing at least some MOG, e.g. a substantial minority or a majority thereof, to exit the side(s) of the agricultural vehicle 100. In this regard, MOG is allowed to exit the side(s) of the agricultural vehicle 100 before the MOG travels further downstream to the cleaning system 116. Hence, the amount of MOG exiting the rear of the rotor 124 is reduced, and thereby the cleaning system 116 and/or the residue system 150 may operate more efficiently due to the decreased amount of MOG. Additionally, the amount of back pressure within the agricultural vehicle 100 may be reduced because air and MOG is allowed to efficiently exit the side(s) of the agricultural vehicle before the air and MOG cause a buildup of back pressure near the rear of the agricultural vehicle 100. Thus, the vented exterior side members 154 and the air conduit 158 increase the cleaning capacity of the agricultural vehicle 100 by creating the additional outlets 156 and preventing unnecessary loading of the cleaning system 116 with MOG that can be easily separated beforehand. In other words, the vented side members 154 and the air conduit 158 turn the grain pan area into a more productive portion of the agricultural vehicle 100.

As shown in FIG. 2, a pair of exterior side members 154 are supported by the chassis 102. The exterior side members 154 may be in the form of fixedly or removably attached doors 154 and/or side panels 154. In the present exemplary embodiment, the exterior side members 154 are in the form of detachable doors 154 that allow an operator to easily access the threshing and separating system 114. Each exterior side member 154 has at least one outlet 156 that can be in the form of a cutout, a vent, and/or a slot. For example, each exterior side member 154 may have two vents 156. The outlets 156 may be positioned relative to the rotor 124 such that the outlets 156 can be located beneath, inline, and/or above the rotor axis RA of the rotor 15. Additionally, the outlets 156 can be positioned on the exterior side members 154 such that the outlets 156 are adjacently located near to the front, middle, and/or rear of the rotor 124. Each outlet 156 may include one or more louver(s) 160, e.g. slats, that extend inwardly and/or outwardly from a respective exterior side member 154. The louvers 160 prevent the threshed grain from exiting the vents 156 and allow the MOG to pass through the vents 156. For instance, the louvers 160 can have an inverted geometry such that the louvers 160 extend over a portion of a respective outlet 156 and inwardly toward the interior of the agricultural vehicle 100.

The air conduit 158 can be located underneath the rotor 124 and can extend along the rotor axis RA underneath at least a portion of the rotor 124. For instance, the air conduit 158 can extend from the front end of the rotor 124 to the approximate middle of the rotor 124. The air conduit can also be positioned upstream of the cleaning system 116 so that the airstream A forces MOG out of the outlets 156 before the MOG has the opportunity to travel further downstream to the cleaning system 116. The air conduit 158 can be positioned directly underneath the center rotor 124, or the air conduit 158 can be positioned off-center, e.g. at the right of the centerline of the rotor 124. The air conduit 158 can have perforations and/or vents which correspondingly direct the airstream A flowing therethrough. The air conduit 158 may direct the airstream A outwardly toward each exterior side member 154 so that the airstream A does not direct the MOG toward the rear of the rotor 124. In this respect, the distribution of crop material falling onto the grain pan plane after it has been threshed may be biased toward a particular area underneath the rotor 124 and toward a respective side of the agricultural vehicle 100, such as the side areas SA (FIG. 2). It is conceivable to address the distribution of the threshed crop material by providing an additional airstream, modifying the existing airstream, providing distribution guide plates, and/or modifying the grain pan 136. A designated, motorized fan 162 can be fluidly coupled with the air conduit 158 in order to provide the requisite airstream A (FIG. 1). In another exemplary embodiment, the existing cleaning fan 140 may be fluidly connected to the airstream such that a portion of the pressurized airflow provided by the cleaning fan 140 is directed to the air conduit 158 (not shown). It should be appreciated that the agricultural vehicle 100 may include two or more air conduits 158 and/or a center conduit with multiple air conduit branches in order to more specifically direct the airstream. It should also be appreciated that the agricultural vehicle 100 may not include an air conduit 158.

Figure 3:
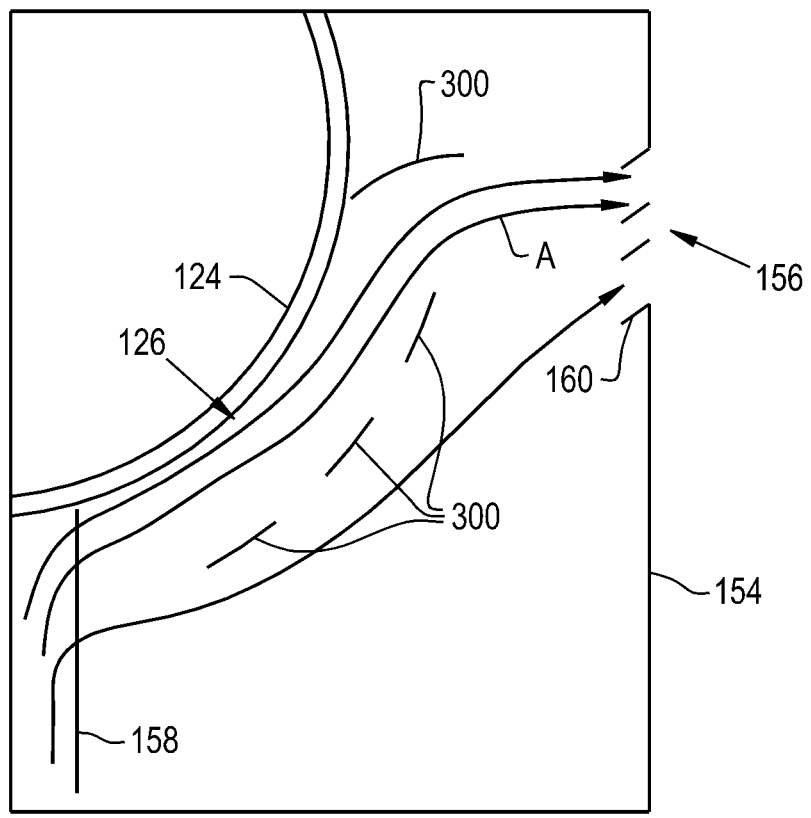
FIG. 3 illustrates a schematic view of the agricultural vehicle of FIG. 1 further including guide plates, in accordance with an exemplary embodiment of the present invention.

Referring now to FIG. 3, there is shown another exemplary embodiment of the agricultural vehicle 100 which further includes guide plates 300. The guide plates 300 can be positioned adjacent to the rotor 124 in order to increase the blast wrap of the airstream A such that the MOG is guided concentrically around the rotor axis RA and outwardly through the outlets 156. As shown, the agricultural vehicle 100 includes four guide plates 300; three for directing the airstream A upwardly and one for directing the airstream A outwardly toward the outlets 156. The guide plates 300 can be connected to a structural support member of the agricultural vehicle 100.

Figure 4:
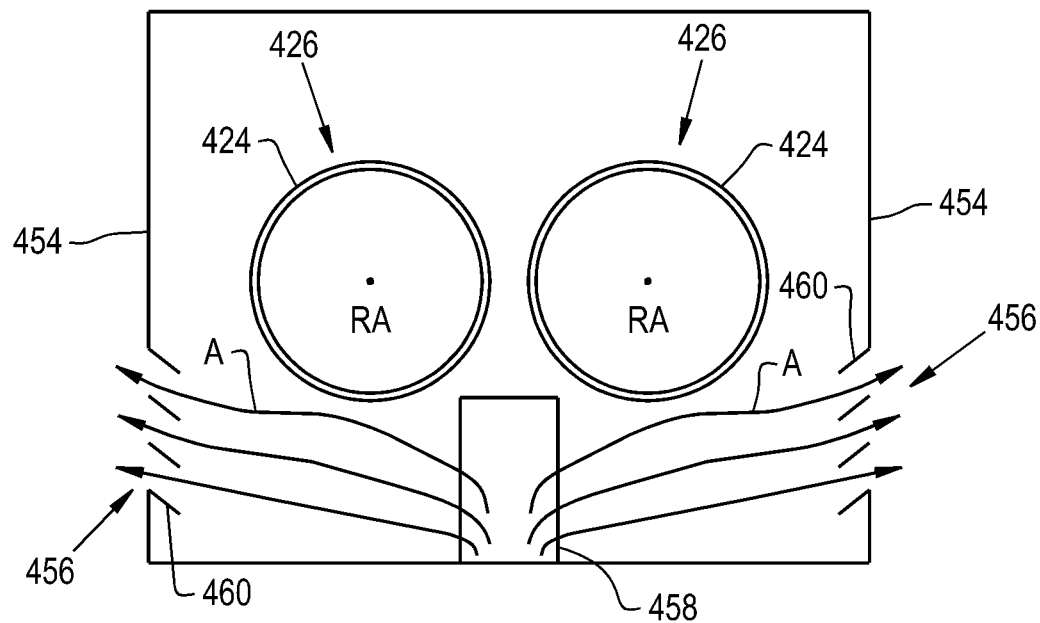
FIG. 4 illustrates a schematic view of another embodiment of an agricultural vehicle having twin rotors, in accordance with an exemplary embodiment of the present invention.

Referring now to FIG. 4, there is shown another exemplary embodiment of an agricultural vehicle 400 which includes twin rotors 424. Except for the twin rotor 424, the agricultural vehicle 400 may be substantially the same as the agricultural vehicle 100 as discussed above; and thereby, like parts have been identified with like reference characters except with the 400 series designation. The agricultural vehicle 400 may be in the form of a twin rotor, axial flow combine 400, such as the New Holland® CR SERIES TWIN ROTOR® COMBINE manufactured by CNH Industrial, LLC. The air conduit 458 may be positioned symmetrically in between the rotors 424 in order to evenly force the MOG toward a respective outlet 456 of each side of the agricultural vehicle 400. It is conceivable to include two air conduits 458 that are respectively positioned underneath each rotor 424 (not shown).

Figure 5:
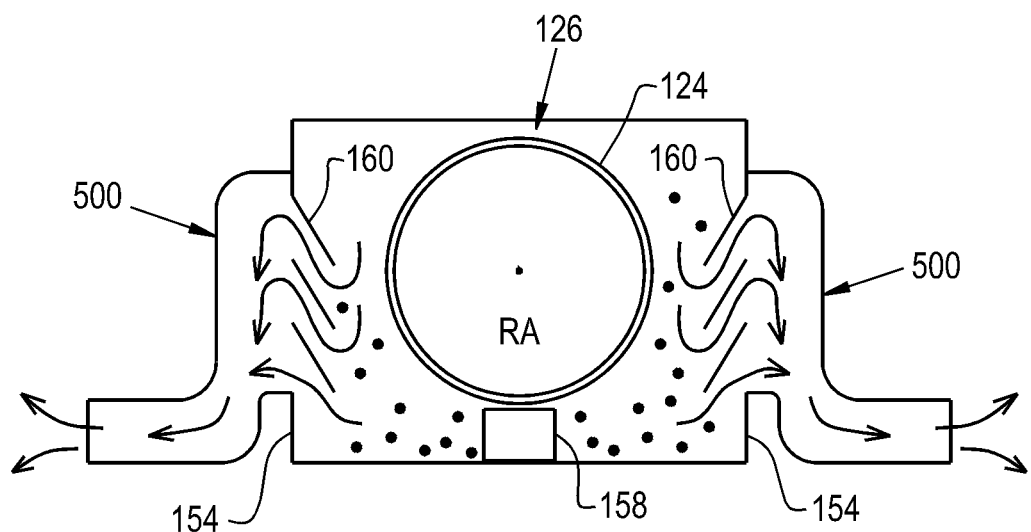
FIG. 5 illustrates a schematic view of another embodiment of an agricultural vehicle having vented side members and ducts attached thereto, in accordance with an exemplary embodiment of the present invention.
Figure 6:
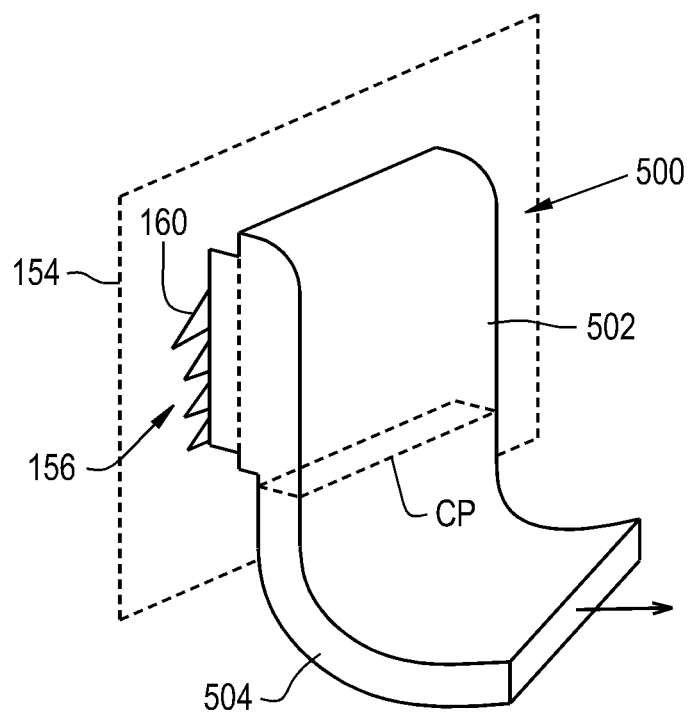
FIG. 6 illustrates a perspective view of a duct, in accordance with an exemplary embodiment of the present invention.
Figure 7:
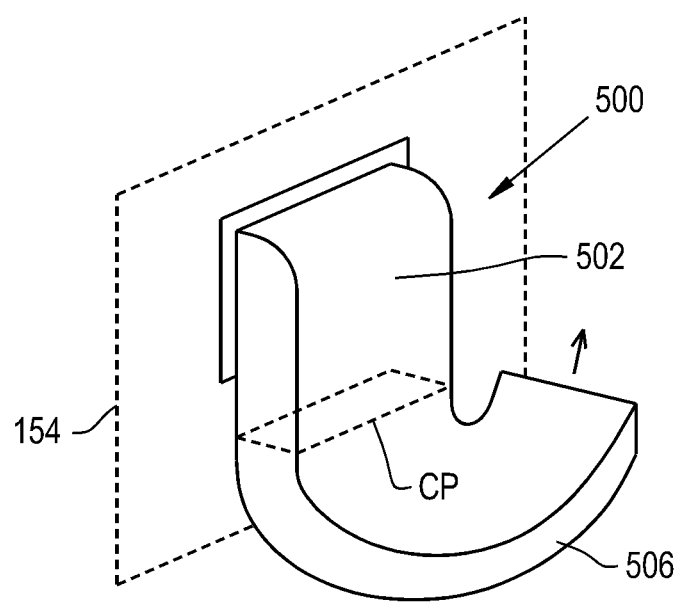
FIG. 7 illustrates a perspective view of another embodiment of a duct, in accordance with an exemplary embodiment of the present invention.

Referring now to FIGS. 5-7, there is shown another embodiment of the agricultural vehicle 100 which further includes one or more duct(s) 500 that further direct the MOG after it has passed through the outlets 156. Each duct 500 can be fixedly or removably connected to a respective exterior side member 154 and can be fluidly coupled to each outlet 156. In the present exemplary embodiment, a duct 500 is removably connected to each exterior side member 154. Each duct 500 can be monolithically formed as a single molded part or may be sectionally designed with one or more components being fixedly or removably attached to one another. In the present exemplary embodiment, the ducts 500 are composed of two sectional components: an upper duct section 502, which downwardly directs the MOG, and a first lower duct section 504 to direct the MOG outwardly (FIG. 6) or a second lower duct section 506 to direct the MOG rearwardly (FIG. 7). Thereby, each duct 500 can initially extend downwardly, and then may further extend outwardly (FIG. 6) or rearwardly (FIG. 7) such that the MOG is directed downward and then outwardly or rearwardly, respectively. The upper duct section 502 can be removably connected to the exterior side member 154, and one of the lower duct sections 504, 506 can be removably connected to the upper duct section 502. In more detail, the upper duct section 502 may fit within or enclose a periphery of a respective outlet 156 and can removably attach to a respective exterior side member 154 via corresponding fittings, clasps, hooks, and/or fasteners. Either lower duct section 504, 506 may removably connect to the upper duct section at a connection point CP via corresponding fittings, clasps, hooks, and/or fasteners.

Figure 8:
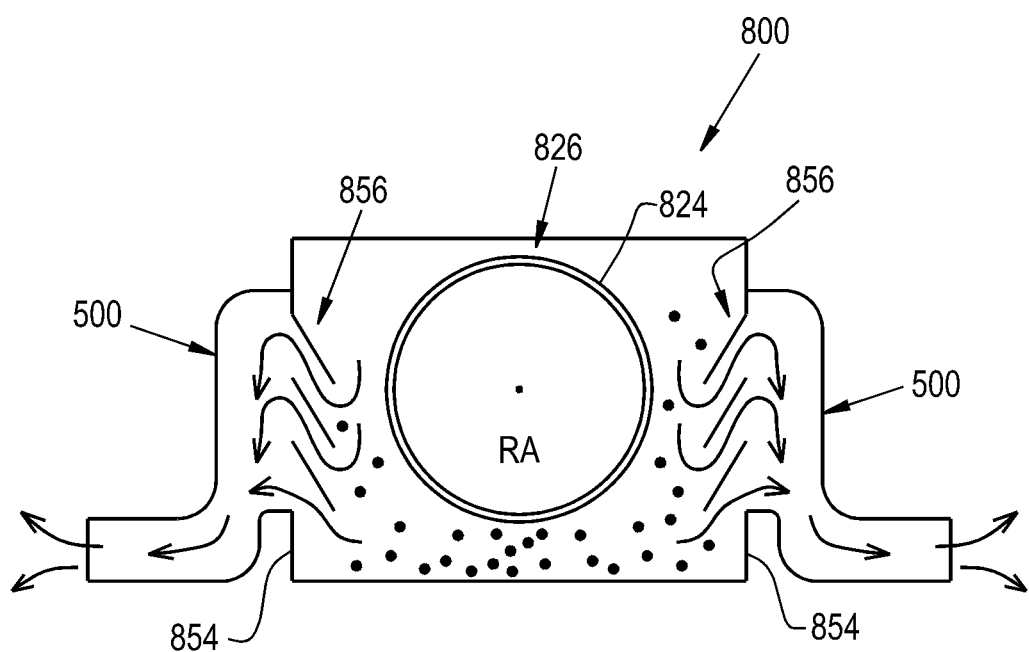
FIG. 8 illustrates a schematic view of another embodiment of an agricultural vehicle having vented side members and ducts attached thereto, in accordance with an exemplary embodiment of the present invention.

Referring now to FIG. 8, there is shown another embodiment of an agricultural vehicle 800 which may be in the form of the agricultural vehicle 100 as described above, except that the agricultural vehicle 800 does not include an air conduit 158 and/or a designated fan 162. Thereby, like reference characters have been identified with like reference numerals but with the 800 series designation. The agricultural vehicle 800 may also include one or more side ducts 500 as described above. Since the air conduit 158 is not included in the agricultural vehicle 800, the existing air volume and back pressure within the agricultural vehicle 800 creates the necessary airflow which moves the MOG away from the rotor 824 and out through the outlets 856. In other words, the operation of the rotor 826 and the cleaning fan 140 creates back pressure within the agricultural vehicle 800, and due to this back pressure, the airstream and MOG escapes through the outlets 856 at the sides of the agricultural vehicle 800.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   a chassis;
   at least one rotor supported by the chassis and configured for threshing a crop material, the at least one rotor defining a rotor axis;
   at least one exterior side member supported by the chassis and including at least one outlet;
   an air conduit located underneath the at least one rotor and configured for providing an airstream directed to the at least one exterior side member such that the airstream forces a material other than grain out through the at least one outlet; and
   a plurality of guide plates adjacent to the rotor and configured for guiding the material other than grain concentrically around the rotor axis,
   wherein the air conduit extends along the rotor axis underneath at least a portion of the at least one rotor.

2. The agricultural vehicle of claim 1, wherein the airstream does not direct the material other than grain toward a rear of the at least one rotor and instead forces the material other than grain out of the agricultural vehicle through the at least one outlet.

3. The agricultural vehicle of claim 2, further comprising a cleaning system having a grain pan, wherein the air conduit is located upstream of the cleaning system such that the material other than grain does not travel downstream to the cleaning system but instead exits through the at least one outlet.

4. The agricultural vehicle of claim 1, wherein the at least one exterior side member is in the form of a pair of detachable side doors such that the air conduit directs the airstream toward each of the detachable side doors.

5. The agricultural vehicle of claim 1, wherein the at least one outlet of the at least one exterior side member is in the form of at least one vent.

6. The agricultural vehicle of claim 5, wherein the at least one vent includes a plurality of louvers that are configured for preventing a threshed grain from exiting the at least one vent and allowing the material other than grain to pass therethrough.

7. The agricultural vehicle of claim 1, further comprising at least one duct removably connected to the at least one exterior side member and configured for further directing the material other than grain after it exits through the at least one outlet.

8. The agricultural vehicle of claim 7, wherein the at least one duct is fluidly coupled to the at least one outlet and extends downwardly away from the at least one outlet and is configured for downwardly directing the material other than grain as well as one of outwardly directing and rearwardly directing the material other than grain.

9. The agricultural vehicle of claim 7, wherein the at least one duct is composed of a first section removably connected to the at least one exterior side member and a second section removably connected to the first section.

10. A method of operating a threshing system of an agricultural vehicle including a chassis, at least one rotor defining a rotor axis supported by the chassis and configured for threshing a crop material, at least one exterior side member supported by the chassis and including at least one outlet, an air conduit located underneath the at least one rotor and configured for providing an airstream directed to the at least one exterior side member, and a plurality of guide plates adjacent to the rotor and configured for guiding the material other than grain extending around the rotor axis, and the air conduit extending along the rotor axis underneath at least a portion of the at least one rotor, the method comprising steps of:
    threshing the crop material by the at least one rotor;
    forcing an air blast, by the air conduit, outward from the at least one rotor toward the at least one exterior side member; and
    directing a material other than grain out through the at least one outlet such that the material other than grain exits a side of the agricultural vehicle before traveling downstream of the at least one rotor.

11. The method of claim 10, wherein the agricultural vehicle further includes at least one duct removably connected to the at least one exterior side member, and the at least one duct is fluidly coupled to the at least one outlet and extends downwardly away from the at least one outlet.

12. The method of claim 11, further comprising a step of downwardly directing and one of outwardly directing and rearwardly directing the material other than grain by the at least one duct.

13. The method of claim 10, wherein the at least one outlet of the at least one exterior side member is in the form of at least one vent, and the at least one vent includes a plurality of louvers that are configured for preventing grain from exiting the at least one vent and allowing the material other than grain to pass therethrough.

* * * * *